(12) United States Patent
Leon

(10) Patent No.: US 7,866,679 B1
(45) Date of Patent: Jan. 11, 2011

(54) TRASH CAN CART APPARATUS

(76) Inventor: Daniel F. Leon, 9 Main St., Garnerville, NY (US) 10923

( * ) Notice: Subject to any disclaimer, the term of this patent is extended or adjusted under 35 U.S.C. 154(b) by 263 days.

(21) Appl. No.: 12/255,226

(22) Filed: Oct. 21, 2008

(51) Int. Cl.
*B62B 1/26* (2006.01)

(52) U.S. Cl. ............... 280/79.5; 280/47.131; 280/47.34

(58) Field of Classification Search ............ 280/47.131,
280/47.16, 47.17, 47.19, 47.24, 47.26, 47.34,
280/79.11, 79.5, 79.7, 47.371, 655.1, 639;
403/1, 72, 73, 83, 84, 91, 104, 119, 150,
403/151, 152, 161, 162, 164, 321, 322.1,
403/322.3, 324, 325
See application file for complete search history.

(56) References Cited

U.S. PATENT DOCUMENTS

| | | | | |
|---|---|---|---|---|
| 2,930,561 | A * | 3/1960 | Bittle | ............................ 248/149 |
| 2,940,707 | A * | 6/1960 | Bland et al. | .................. 248/129 |
| 3,028,015 | A | 4/1962 | Williams | |
| 3,292,795 | A | 12/1966 | Holdeer | |
| 3,399,903 | A | 9/1968 | Bailey | |
| 3,479,047 | A * | 11/1969 | Bailey | ...................... 280/47.19 |
| 3,547,273 | A * | 12/1970 | Bompart | ........................ 211/84 |
| 3,749,414 | A | 7/1973 | Lynn | |
| 3,907,117 | A | 9/1975 | Willaims | |
| 4,313,612 | A * | 2/1982 | Rubens | ........................ 280/79.5 |
| 4,357,029 | A | 11/1982 | Marini et al. | |
| 4,821,903 | A * | 4/1989 | Hayes | ....................... 280/47.26 |
| 4,832,222 | A * | 5/1989 | Storton | ............................ 220/6 |
| 5,011,168 | A * | 4/1991 | Deamicis | .................. 280/47.26 |
| 5,040,808 | A * | 8/1991 | McIntyre | .................. 280/47.19 |
| D327,758 | S | 7/1992 | Farrell | |
| D399,032 | S | 9/1998 | Limbaugh | |
| 7,232,136 | B2 | 6/2007 | Sheehan | |
| 2003/0006586 | A1 * | 1/2003 | Comilla | ....................... 280/651 |
| 2007/0152411 | A1 * | 7/2007 | Lox et al. | ................. 280/47.17 |

* cited by examiner

*Primary Examiner*—J. Allen Shriver, II
*Assistant Examiner*—John D Walters
(74) *Attorney, Agent, or Firm*—Crossley Patent Law; Mark A. Crossley

(57) ABSTRACT

The trash can cart apparatus provides a frame which selectively encloses two separate trash cans, allowing a user to use different sizes of trash cans, selectively. Each individually pivoted keeper is u-shaped and selectively covers each can. Each keeper further comprises a screen to prevent access to trash can lids, especially by animals, each keeper positionably lockable, and requiring the latch mechanism to be manually released prior to pivot. Each can if fully secured by frame and keepers only. The multiple lower laterals provide that any can is supported by at least two laterals. The apparatus needs only two wheels. The wheels are positioned at the lower front and the pivoting handle at the upper front. A user need only grasp the handle to pivot the mass of the apparatus, along with any trash cans.

1 Claim, 5 Drawing Sheets

TRASH CAN CART APPARATUS

BACKGROUND OF THE INVENTION

Numerous trash can holding devices, carts, and mobile cans have been previously provided. Each differs in some unique manner, and each may provide a particular advantage to a consumer. Needs still exist for various features in a mobile trash can cart. Expense is one important consideration. For this reason, a properly designed cart should provide secure can support without the expense of full enclosure. Additionally, limiting to two wheels further reduces expense and improves mobility. Two wheels without a lengthy axle further reduces expense. Another problem is physical ease of movement, meaning lessened physical exertion. Many previously offered devices require significant lifting on the end of the cart opposite the wheels. A user must therefore lift and support not only the cart but also any load upon or within the cart. A two wheeled cart which tilts onto the two wheels in transport, tilted at the same side of the wheels, eliminates such severe lifting.

Prevention of invasion by animals, whether domestic or wild is also a primary concern, almost universally. Considering the strength and intelligence of some animals, such as a raccoon for example, properly designed animal proofing is a real challenge. Yet, the animal proofing should be easily overcome by a human so that loading and unloading the trash cans and their lids is easily accomplished. Another concern is the number of cans held by a device. Typical municipalities allow two cans to be deposited for pick up; therefore a single can holder is inefficient, as is a can holder which accommodates more than two cans. The present apparatus solves the above noted problems.

FIELD OF THE INVENTION

The trash can cart apparatus relates to trash storage devices and more especially to a mobile cart which holds two trash cans, prevents animal invasion, is easily moved, and is inexpensively produced and sold.

SUMMARY OF THE INVENTION

The general purpose of the trash can cart apparatus, described subsequently in greater detail, is to provide a trash can cart apparatus which has many novel features that result in an improved trash can cart apparatus which is not anticipated, rendered obvious, suggested, or even implied by prior art, either alone or in combination thereof.

To attain this, the trash can cart apparatus provides a frame which selectively encloses two separate trash cans. The frame allows a user to use different sizes of trash cans, selectively. Each individually pivoted keeper is u-shaped and selectively covers each can. Each keeper provides a pair of convex bends which elevates the overall height of each keeper to accommodate taller cans. Each keeper further comprises a screen to prevent access to trash can lids, especially by clever or strong animals. Each keeper is positionable and lockable, so that an animal, even the cleverest, cannot operate the latch mechanism to release the keeper from containing a trash can and its lid. Lockably positioning each keeper provides greater convenience for a user in loading and unloading trash cans and in filling trash cans.

A further advantage of the apparatus is that the goals are accomplished with frame and keepers only, negating the need for full can enclosures, thus saving expenses in production and sale. Yet another advantage is that the multiple lower laterals provide that any can is supported by at least two laterals.

A further advantage of the apparatus is that only two wheels are needed, further saving in expense of production and sale and also providing greater maneuverability. Each wheel is independently axled, further decreasing production and sale cost, by comparison to a single lengthy axle. Yet another advantage offered by the apparatus is that the wheels are positioned at the lower front and the pivoting handle at the upper front.

A user need only grasp the handle to pivot the mass of the apparatus, along with any trash cans, whether full or empty, and transport the entirety as needed, this opposed to having lift the entire apparatus at an end opposite the wheels. The handle above the wheels allows a user to find a balance point of any given load, and convey the apparatus with load without any physical strain.

Thus has been broadly outlined the more important features of the improved trash can cart apparatus so that the detailed description thereof that follows may be better understood and in order that the present contribution to the art may be better appreciated.

An object of the trash can cart apparatus is to be easily mobile with substantially no lifting of the apparatus, with or without load.

An object of the trash can cart apparatus is to be pivotally mobile via a handle on the same side as the wheels.

Another object of the trash can cart apparatus is to be animal proof.

A further object of the trash can cart apparatus is to provide ease of mobility with only two wheels.

An object of the trash can cart apparatus is to provide easy access to cans removably held within.

An added object of the trash can cart apparatus is to inexpensively produced and sold.

And, an object of the trash can cart apparatus is to supportively contain more than one trash can without complete enclosure of the cans.

These together with additional objects, features and advantages of the improved trash can cart apparatus will be readily apparent to those of ordinary skill in the art upon reading the following detailed description of presently preferred, but nonetheless illustrative, embodiments of the improved trash can cart apparatus when taken in conjunction with the accompanying drawings.

In this respect, before explaining the current embodiments of the improved trash can cart apparatus in detail, it is to be understood that the trash can cart apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved trash can cart apparatus. It is therefore important that the claims be regarded as including such equivalent constructions insofar as they do not depart from the spirit and scope of the trash can cart apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 7 thereof, the principles and concepts of the trash can cart apparatus generally designated by the reference number 10 will be described.

Figure 1:
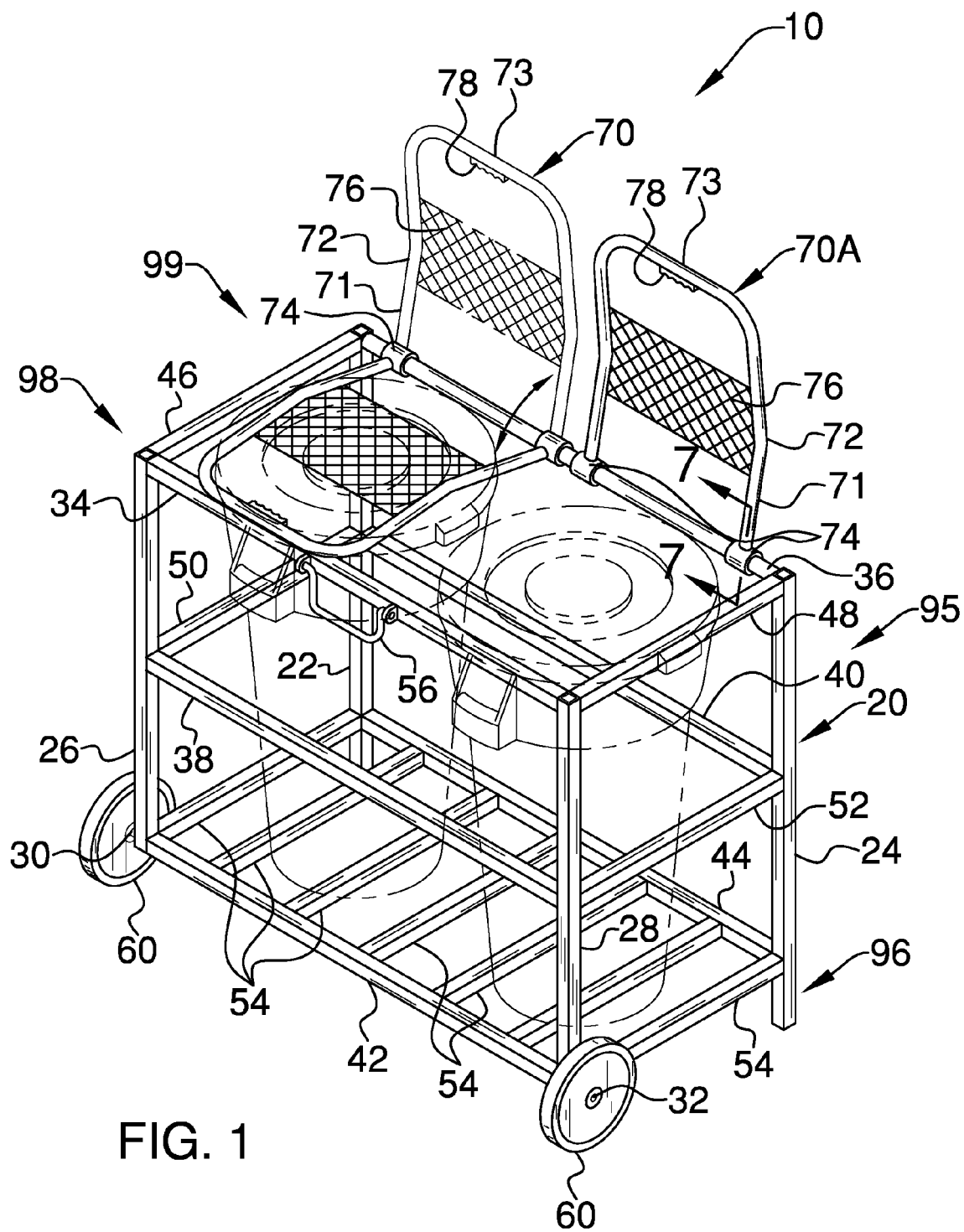
FIG. 1 is a perspective view of the apparatus in use.

Referring to FIG. 1, the trash can cart apparatus 10 partially comprises the hexahedron frame 20 selectively holding a pair of existing garbage cans 100 within. The frame 20 has a front 98, a rear 99, a top 95, and a bottom 96. The frame 20 further comprises a first vertical frame support 22 spaced apart from a second vertical frame support 24, each disposed at the rear 99 of the frame 20. The first wheeled support 26 is spaced apart from the second wheeled support 28, each disposed at the front 98 of the frame 20. A pair of axles is comprised of a first axle 30 and a second axle 32. The first axle 30 is disposed on the first wheeled support 26. The second axle 32 is disposed on the second wheeled support 28. Each of the axles is disposed proximal to the bottom 96 of the frame 20.

The first lower longitudinal 42 connects the first wheeled support 26 to the second wheeled support 28. The first lower longitudinal 42 is disposed proximal to the bottom 96 front 98 of the frame 20. The first mid longitudinal 38 is spaced apart from the first lower longitudinal 42. The first mid longitudinal 38 connects the first wheeled support 26 to the second wheeled support 28. The upper longitudinal 34 is spaced apart from the first mid longitudinal 38. The upper longitudinal 34 connects the first wheeled support 26 to the second wheeled support 28. The pivoting handle 56 is disposed on the upper longitudinal 34 of the front 98 of the frame 20. The apparatus 10 is selectively mobile by pivoting onto the wheels 60 by use of the handle 56. The second lower longitudinal 44 connects the first vertical support 22 to the second vertical support 24. The second lower longitudinal 44 is disposed proximal to the bottom 96 of the frame 20. The second mid longitudinal 40 is spaced apart from the second lower longitudinal 44. The second mid longitudinal 40 connects the first vertical support 22 to the second vertical support 24. The round longitudinal 36 is spaced apart from the second mid longitudinal 40. The round longitudinal 36 connects the first vertical support 22 to the second vertical support 24. The round longitudinal 36 is disposed at the top 95 of the frame 20.

Figure 7A:
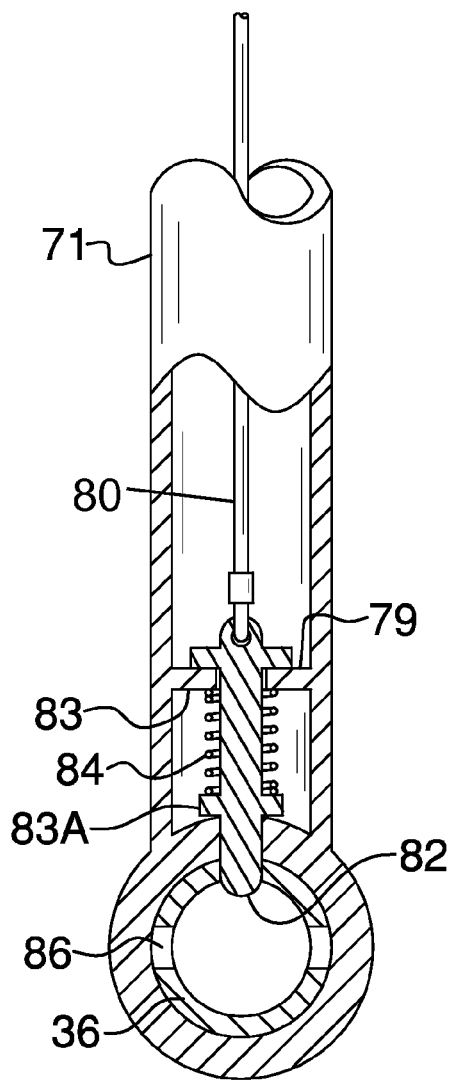
FIG. 7A is a cross sectional view of the positionally latchable keeper, latched.
Figure 7B:
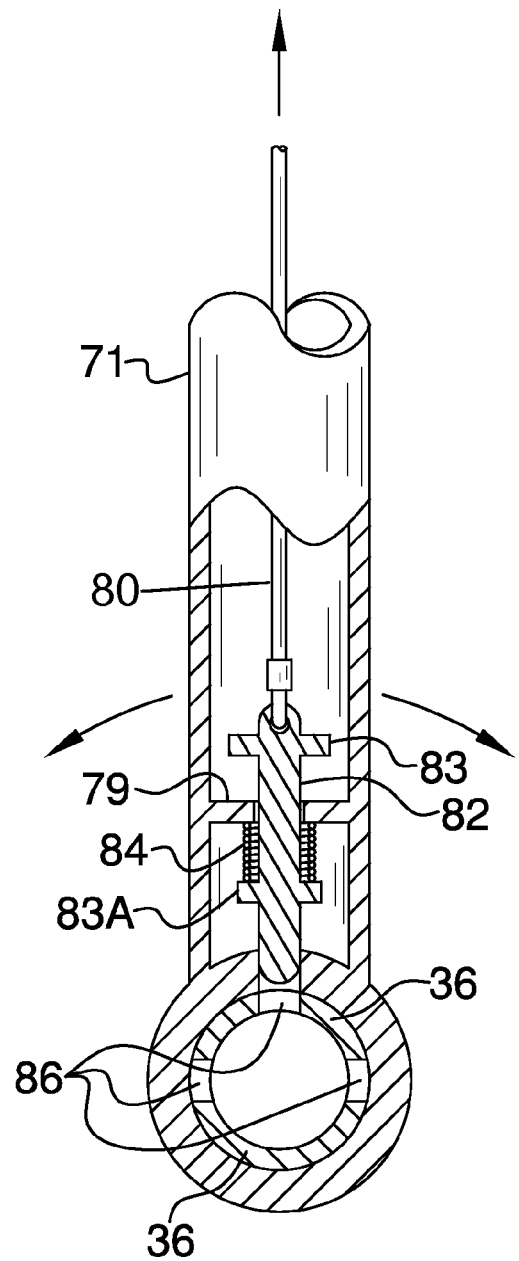
FIG. 7B is a cross sectional view of the positionally latchable keeper, unlatched.

Referring also to FIGS. 7A and 7B, the quartet of spaced apart sets of index holes 86 is disposed within the round longitudinal 36. Each set comprises a trio of holes 86. Each hole 86 is spaced about ninety degrees apart.

Continuing to refer to FIG. 1, the plurality of spaced apart lower laterals 54 is disposed proximal to the bottom 96 of the frame 20. The lower laterals 54 connect the first lower longitudinal 42 to the second lower longitudinal 44. The lower laterals 54 are arranged such that at least two lower laterals 54 support a given trash can 100. The first mid lateral 50 is spaced apart from the lower laterals 54. The first mid lateral 50 connects the first wheeled support 26 to the first vertical support 22. The first upper lateral 46 is disposed at the top 95 of the frame 20. The first upper lateral 46 connects the first wheeled support 26 to the first vertical support 22. The second mid lateral 52 is spaced apart from the lower laterals 54. The second mid lateral 52 connects the second wheeled support 28 to the second vertical support 24. The second upper lateral 48 is spaced apart from the second mid lateral 52. The second upper lateral 48 is disposed at the top 95 of the frame 20. The second upper lateral 48 connects the second wheeled support 28 to the second vertical support 24. The pair of pivotal spaced apart u-shaped keepers comprising a first keeper 70 and a second keeper 70a. Each keeper is pivotally affixed to the round longitudinal 36. Each keeper selectively pivots to cover a garbage can 100 placed within the frame 20.

Referring to FIG. 4 and referring again to FIGS. 7A and 7B, each keeper further comprises a pair of spaced apart legs 71 connected by a base 73. A collar 74 is disposed at the end of each leg 71. A convex bend 72 is disposed within each leg 71. Each convex bend 72 provides for clearance over particular existing trash cans 100 which might have a taller lid than another. A screen 76 is disposed at least partially between each leg 71 of the keepers.

The screen 76 is between and on an either side of each convex bend 72. The screen 76 protects the trash can 100 against animal invasion. A limit 79 is disposed within each leg 71 proximal to the collar 74. A locator pin 82 is slideably disposed within each limit 79. The locator pin 82 further comprises a first stop 83 spaced apart from a second stop 83a. Each stop is disposed on an opposite side of the leg 71 limit 79. A compression spring 84 is disposed between the limit 79 and the second stop 83a. The spring 84 pushes the locator pin 82 into one of the index holes 86 of the round longitudinal 36, thus preventing rotation of each keeper's collar 74 around the round longitudinal 36. This provides for each keeper to be positioned in a closed position over the frame 20, a half-open vertical position relative to the frame 20, and a fully open position relative to the frame 20 wherein the given keeper is latchably positioned in an inverted vertical position. A cable 80 is disposed within each leg 71. A release handle 78 is disposed within the base 73 of each keeper. The release handle 78 is attached to the cable 80. The release handle 78 allows a user to selectively overcome the compression spring 84 to release the locator pin 82 from one of the index holes 86, allowing the collars 74 to rotate around the round longitudinal 36.

Figure 2:
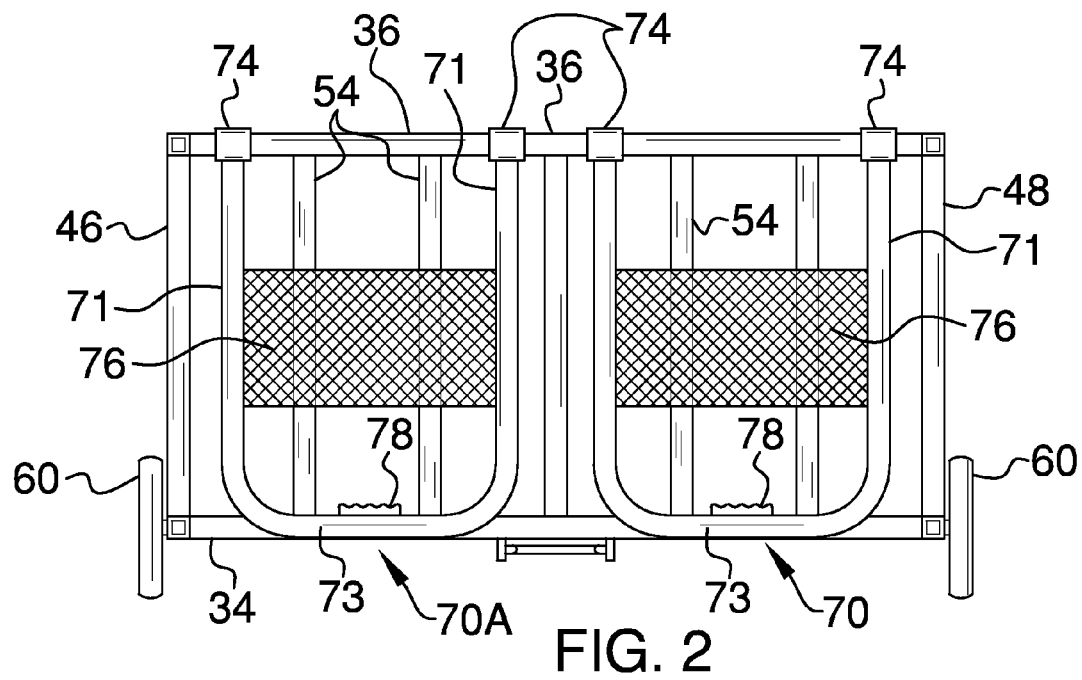
FIG. 2 is a top plan view, keepers positioned over the frame.

Referring to FIG. 2, the both the first keeper 70 and the second keeper 70a are lockably positioned over the frame 20 in the closed position, thereby preventing invasion by an animal. The screens 76 effectively cover any trash can 100 that might be held within the frame 20. Each release handle 78 provides for release and pivot of each keeper.

Figure 3:
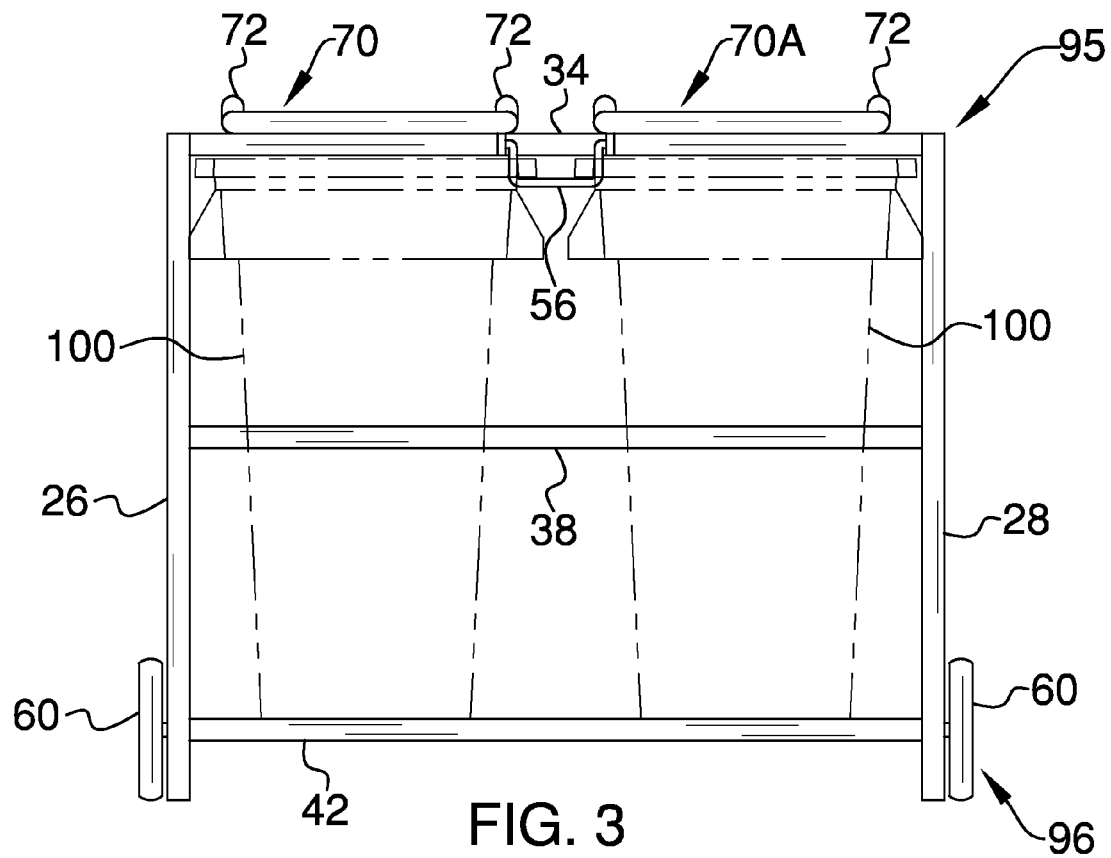
FIG. 3 is a front elevation view, keepers positioned over the frame.
Figure 4:
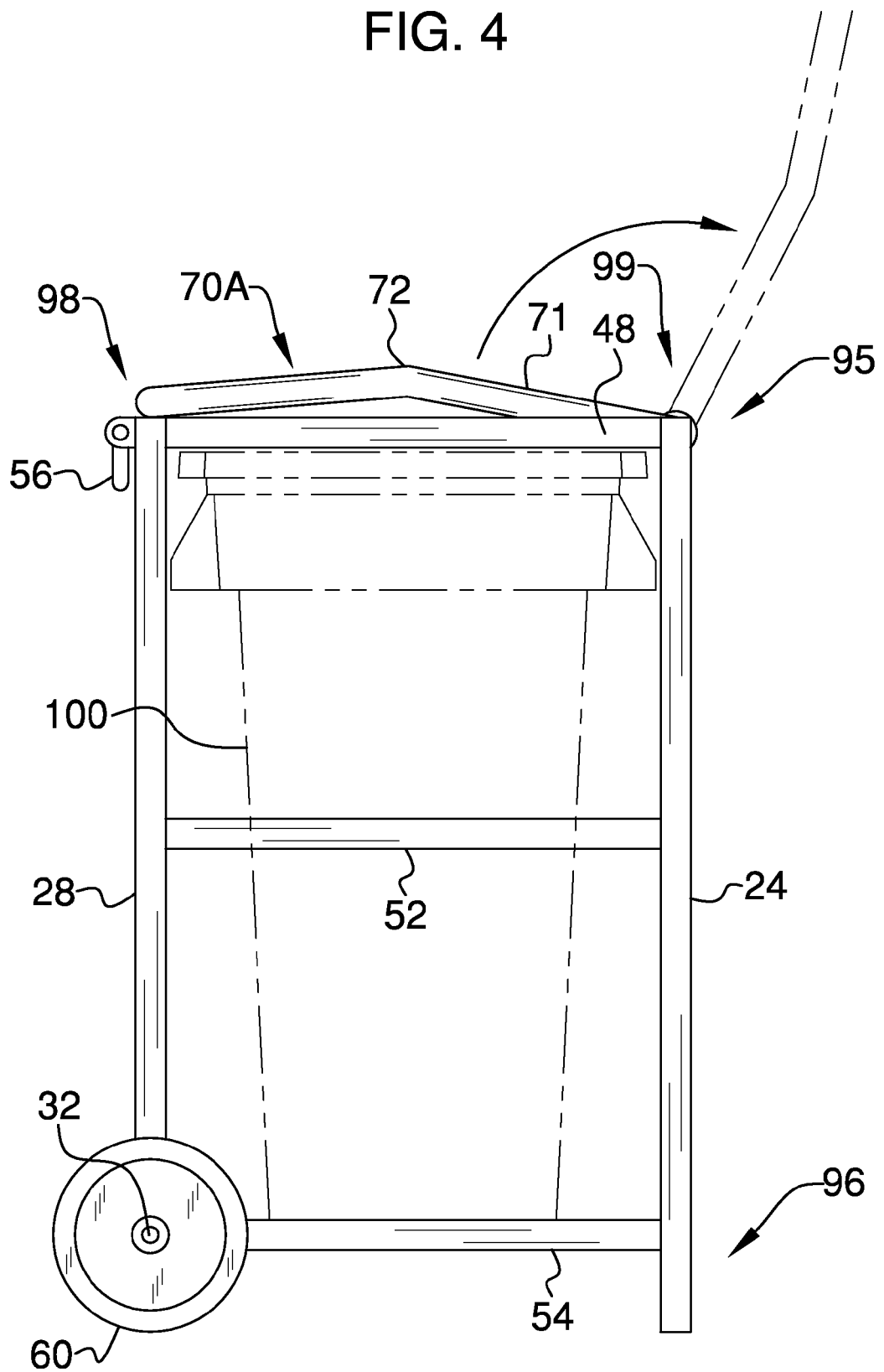
FIG. 4 is a lateral elevation view.

Referring to FIG. 3, the front 98 view of the apparatus 10 illustrates the elevation of the keepers provided by the convex bends 72.

Figure 5:
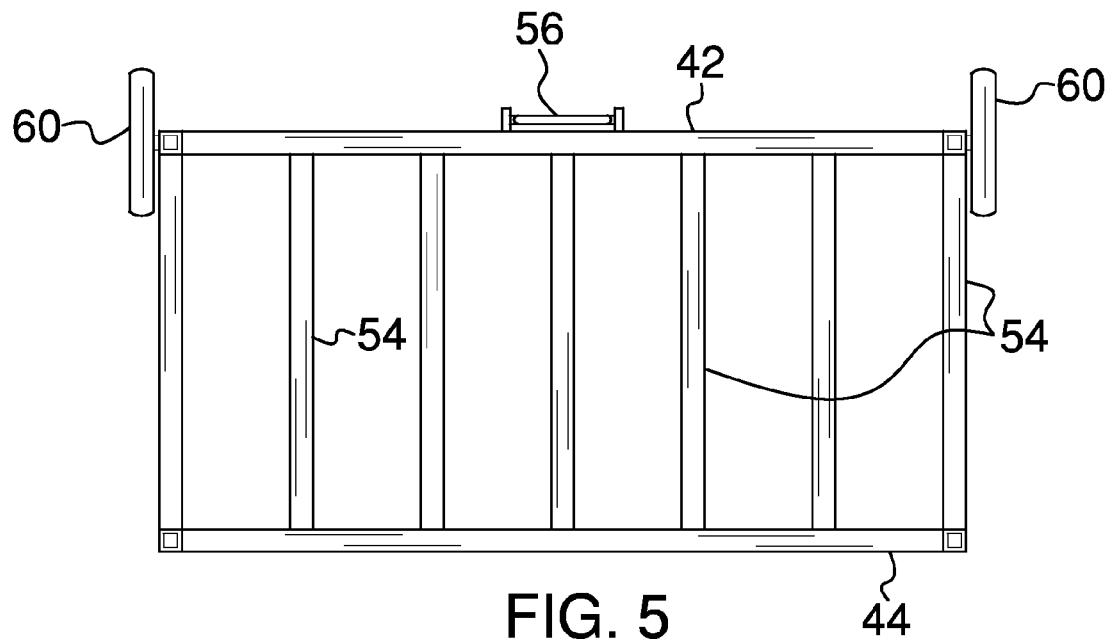
FIG. 5 is a bottom plan view.

FIG. 5 illustrates the multiple lower laterals 54 which selectively support any trash can 100 which might be within the frame 20.

Figure 6:
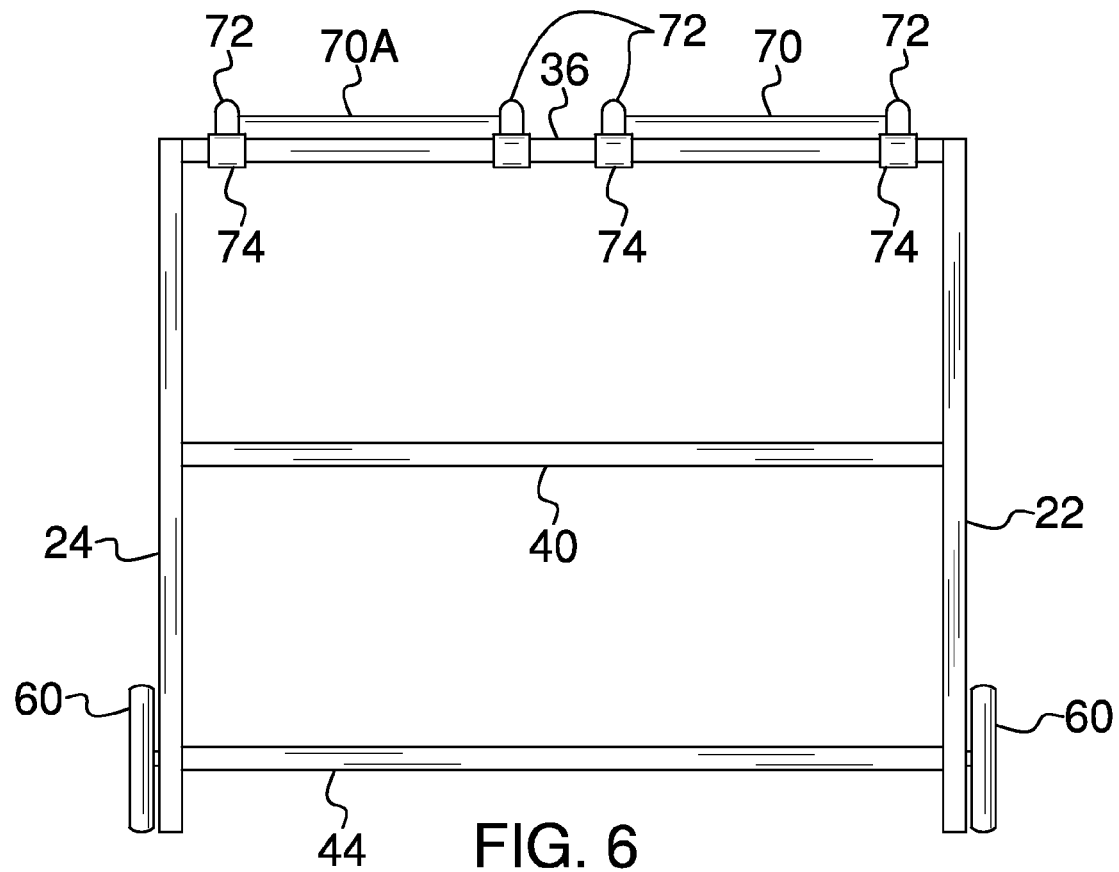
FIG. 6 is a rear elevation view, keepers positioned over the frame.

FIG. 6 illustrates the rear 99 view showing both first keeper 70 and second keeper 70a in the closed, over-the-frame position.

With respect to the above description then, it is to be realized that the optimum dimensional relationships for the parts of the trash can cart apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the trash can cart apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the trash can cart apparatus may be used.

Therefore, the foregoing is considered as illustrative only of the principles of the trash can cart apparatus. Further, since numerous modifications and changes will readily occur to those skilled in the art, it is not desired to limit the trash can cart apparatus to the exact construction and operation shown and described, and accordingly, all suitable modifications and equivalents may be resorted to, falling within the scope of the trash can cart apparatus.

What is claimed is:

1. A trash can cart apparatus, comprising:
    a hexahedron frame selectively holding a pair of existing garbage cans within, the frame having a front, a rear, a top, and a bottom, the frame further comprising:
    a first vertical frame support spaced apart from a second vertical frame support, each support disposed at the rear of the frame;
    a first wheeled support spaced apart from a second wheeled support, each wheeled support disposed at the front of the frame;
    an axle with wheel disposed on each of the first and second wheeled supports, each axle with wheel disposed proximal to the bottom of the frame;
    a first lower longitudinal connecting the first and second wheeled supports, the first lower longitudinal disposed proximal to the bottom front of the frame;
    a first mid longitudinal spaced apart from the first lower longitudinal, the first mid longitudinal connecting the first and second wheeled supports;
    an upper longitudinal spaced apart from the first mid longitudinal, the upper longitudinal connecting the first and second wheeled supports;
    a handle disposed on the upper longitudinal of the front of the frame, the apparatus selectively mobile by pivoting onto the wheels by the handle;
    a second lower longitudinal connecting the first vertical support to the second vertical support, the second lower longitudinal disposed proximal to the bottom of the frame;
    a second mid longitudinal spaced apart from the second lower longitudinal, the second mid longitudinal connecting the first vertical support to the second vertical support;
    a round longitudinal spaced apart from the second mid longitudinal, the round longitudinal connecting the first vertical support to the second vertical support, the round longitudinal disposed at the top of the frame;
    a quartet of spaced apart sets of index holes within the round longitudinal, each set comprising a trio of holes, each hole spaced about ninety degrees apart;
    a plurality of spaced apart lower laterals disposed proximal to the bottom of the frame, the lower laterals connecting the first lower longitudinal to the second lower longitudinal;
    a first mid lateral spaced apart from the lower laterals, the first mid lateral connecting the first wheeled support to the first vertical support;
    a first upper lateral disposed at the top of the frame, the first upper lateral connecting the first wheeled support to the first vertical support;
    a second mid lateral spaced apart from the lower laterals, the second mid lateral connecting the second wheeled support to the second vertical support;
    a second upper lateral spaced apart from the second mid lateral, the second upper lateral disposed at the top of the frame, the second upper lateral connecting the second wheeled support to the second vertical support;
    a pair of pivotal spaced apart u-shaped keepers comprising a first keeper and a second keeper, each keeper pivotally affixed to the round longitudinal, each keeper selectively pivotally latchable to cover a garbage can within the frame, each keeper further comprising:
    a pair of spaced apart legs connected by a base;
    a collar at an end of each leg;
    a convex bend within each leg;
    a screen disposed at least partially between each leg of the keeper, the screen between and on an either side of each convex bend;
    a limit within each leg proximal to the collar;
    a locator pin slideably disposed within each limit, the locator pin further comprising a stop spaced apart from a second stop, each stop on an opposite side of a leg limit;
    a compression spring between the limit and the second stop, the spring pushing the locator pin into one of the index holes of the round longitudinal, preventing rotation of each keeper's collar around the round longitudinal;
    a cable within each leg;
    a release handle within the base, the release handle attached to the cable, the release handle selectively overcoming the compression spring to release the locator pin from one of the index holes, allowing the collars to rotate around the round longitudinal.

* * * * *